UNITED STATES PATENT OFFICE.

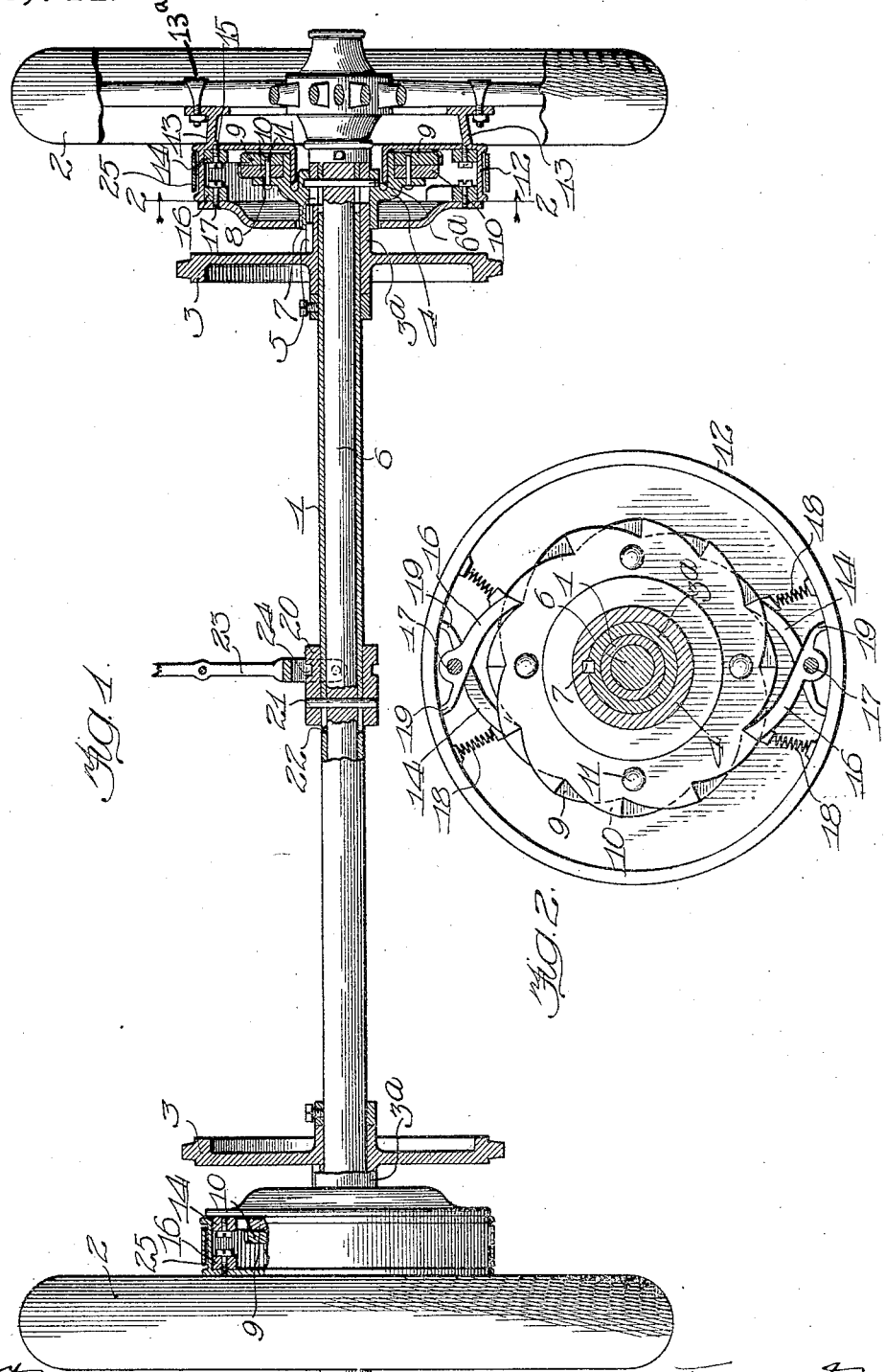

CHARLES B. HATFIELD, JR., OF OSHKOSH, WISCONSIN.

AUTOMOBILE DRIVING MECHANISM.

943,744.  Specification of Letters Patent.  Patented Dec. 21, 1909.

Application filed August 3, 1908. Serial No. 446,698.

*To all whom it may concern:*

Be it known that I, CHARLES B. HATFIELD, Jr., a citizen of the United States, residing at Oshkosh, Winnebago county, Wisconsin, have invented certain new and useful Improvements in Automobile Driving Mechanism, of which the following is a specification.

My invention relates to the driving or power transmitting mechanism of self-propelled vehicles, such as automobiles and the like, and the object thereof is to provide novel and efficient mechanism of this character embodying the function of the usual differential gearing and divided live shafts or axles, which in my construction are dispensed with. My driving mechanism may therefore be considered a combined power-transmitting and differential mechanism. Speaking in general terms, I attain these results by employing a single piece dead axle whether solid or hollow, instead of the usual divided live axle when differential gearing is employed, and equip such axle with driving connections with the road wheels loosely mounted thereon, which connections in the present instance comprise a novel construction and arrangement of ratchets and pawls, with the result that when the vehicle is turning a curve the inside wheel does the driving while the outside wheel is permitted to run ahead. By reason of the ratchet and pawl construction, provision is made for shifting the driving connections whereby the direction of motion of the vehicle may be reversed. Furthermore, in my construction I utilize a part of said driving connections as brake drums to coöperate with the usual brake bands for braking the vehicle.

Other features of novelty and utility in my construction will be apparent from the description hereinafter given.

In the drawing, Figure 1 is an elevation of a pair of driving wheels such as may be used on an automobile, showing one-half thereof in section; and Fig. 2 a sectional elevation on the line 2—2 of Fig. 1 looking in the direction of the arrow, such view being on a somewhat larger scale.

Referring to the present embodiment of my invention, I have preferred to show the same as the driving mechanism of an automobile in which the rear wheels are the ones usually driven. The single piece dead axle 1, on whose outer ends the road wheels 2 are mounted, is here shown as hollow, the same being of tubular form. The driving road wheels are driven, in the present instance, by the two sprocket wheels 3 which are mounted on such axle in any suitable manner.

It will be understood that any suitable driving connections may be employed between the prime mover, such as a gasolene or a steam engine, but for the sake of a clear description I have shown the two sprocket wheels as a part of a train of driving connections in which sprocket wheels and sprocket chains are employed, but without any intention of limitation in this respect.

The driving connections between the sprocket wheels and the driving road wheels are the same for each wheel, with the exception that the pawls and ratchets are reversed in the two sets of driving connections as hereinafter explained. Describing the particular driving connections shown in section at the right hand side of Fig. 1, the sprocket wheel 3 is provided with a hub portion 3ª which is extended outwardly and operatively connected to the hub portion of a ratchet support 4. The hub of the sprocket wheel is secured to said support in any suitable manner, but in the present instance such attachment is obtained by means of a spline and key construction 5 between the hub of the sprocket wheel and the central portion or hub of said support. A pin 6ª passes through a shaft 6 which is arranged within the dead axle and capable of longitudinal movement relative to such axle in order that said ratchet support or carrier may be shifted laterally for the purpose hereinafter described. In order to permit of this longitudinal shifting the axle 1 is longitudinally slotted at 7 in order to accommodate the pin 6ª. This pin does not pass entirely through the hub but said hub revolves and has an internal groove in which the ends of the pin are held.

The support or carrier 4 is provided with a circumferential right-angled recess 8 adapted to receive the two ratchets 9 and 10 which are in the form of rings arranged parallel and in juxtaposition, and having on their peripheries ratchet teeth pitched in opposite directions, that is the teeth of one ratchet are reversed with respect to the other. These ratchets are secured together and to their support or carrier in suitable manner as by means of the rivets 11. The pawls or dogs with which the ratchets coöperate are mounted within a circular casing 12, which is secured to the spokes of the driving wheel in suitable manner, as by means of the fastening devices such as the brackets 13 on the casing and the clips 13ª on the wheel spokes. By preference this casing is adapted not only to support the pawls but also to inclose the operating parts against the entrance of dust, dirt and the like and the periphery is used as a brake drum as hereinafter explained. The pawls, which are preferably four in number, are arranged in two sets, one of them, indicated at 14, being secured to the inside of the pawl carrier adjacent the driving wheel and in position to coöperate with the ratchet 9 when shifted to the position indicated in Fig. 1, such pawls being secured in place and pivoted by means of the pin 15. The other set of pawls indicated at 16 are secured to the opposite inner face of the pawl carrier and are pivoted upon the pins 17.

Assuming that the ratchet 9 coöperates with the pawls 14 to drive the machine forward, and describing the operation at the right hand wheel shown in Fig. 1, the power is transmitted from the prime mover to the sprocket wheel 3 which, through its connection with the ratchet carrier, rotates the latter and consequently the ratchets, with the result that the ratchet 9, being in engagement with the pawls 14, will drive the casing 12 which, being secured to its driving road wheel, will in turn drive or rotate the latter. In reversing the direction of motion of the machine, the shaft 6, which may be hollow or solid as desired, is shifted to the left, with the result that the ratchet 10, which was inactive during the forward motion of the machine or vehicle, now becomes active inasmuch as the same is placed in coöperative relationship with the other set of pawls 16, the distance between the two sets of pawls 14 and 16 being such that either one or the other of the ratchets is inactive, the ratchet 9 now becoming the inactive one. The sprocket wheel 3 being now rotated in the reverse direction by the prime mover, the wheel 2 is likewise reversed in direction of rotation, the direction or pitch of the teeth on the ratchet 10 being reversed with respect to the teeth on the ratchet wheel 9 for this purpose. The pawls are normally held with a yielding pressure toward their ratchet wheels, the same being in the present instance spring-pressed by means of the springs 18, but in order to prevent these pawls from being forced too far inwardly toward their ratchets and to thereby permit of said shifting of the ratchets, each pawl is provided with an extension 19 beyond its pivotal point and adapted to contact the inner surface of the pawl carrier or casing 12 in the manner clearly illustrated in Fig. 2.

The movable shaft 6 may be shifted in any desired manner, and as a suitable means for this purpose I have shown a sleeve 20 upon the axle 1 and secured to the shaft by means of a transverse pin 21, said axle 1 being slotted at 22 to accommodate the pin in its longitudinal movements. Any suitable device may be employed to shift the sleeve, such as the shifting arm 23 having a portion adapted to coöperate with the circumferential groove 24.

It will be understood that the left hand road wheel shown in Fig. 1 is provided with a similar set of ratchets and pawls but reversed, so that when the parts are in the relative position shown in Fig. 1 the right hand ratchet 9 is in engagement with the pawls 14, which are here on the opposite side of the interior of the casing as compared with the similar pawls at the other end of the axle.

From the foregoing description it will be apparent that as the vehicle is traveling straight ahead or back, one or the other of the sets of ratchets and pawls is doing the driving at opposite ends of the axle, but when the vehicle is turning a curve the driving is done by the inner wheel, which is the slower moving wheel and as the outer wheel, that is the wheel taking the outer radius must travel faster, the same is permitted to do so by the ratchet and pawl driving connection, at which time the pawls which had been employed in the driving of this particular wheel will now slip over the teeth of their ratchet wheel.

In the present instance I utilize the pawl carrier or casing as a part of the braking device for the vehicle and to this end I form each casing as a brake drum with which coöperate the usual bands 25 of a band-brake which may be of any of the usual and conventional constructions, and which is economical because it dispenses with the cost of other or separate brake drums.

I claim:

1. In driving mechanism for a self-propelled vehicle, the combination, with the driving road wheels of such vehicle, of an axle on which such wheels are mounted to rotate, reversely arranged ratchets mounted to rotate and correspondingly reversed pawls operatively connected to said wheels on their inner faces, means for driving said ratchets, and means for shifting said ratchets to engage one or the other set of pawls; substantially as described.

2. In driving mechanism for a self-propelled vehicle, the combination, with the driving road wheels of such vehicle, of an axle on which such wheels are mounted to rotate, reversely arranged sets of ratchets mounted to rotate and located parallel to each other and in juxtaposition, and correspondingly reversed sets of pawls arranged in parallel planes but separated from each other to permit engagement of one set of ratchets and the simultaneous disengagement of the other set, said pawls being operatively connected with said wheels on their inner faces, means for rotating said ratchets, and means for shifting the latter to engage one or the other set of pawls; substantially as described.

3. In driving mechanism for a self-propelled vehicle, the combination with the road wheels, of a shaft or axle on which the road wheels of the vehicle are mounted to rotate, a ratchet carrier or support at each end of the axle, means for driving said ratchet carriers, a pair of ratchets on each carrier, said ratchets having reversely pitched ratchet teeth, a pawl carrier secured to the inside of each road wheel, sets of pawls mounted on the pawl carriers, the pawls being reversed to coöperate with their respective ratchets, and means for shifting the ratchets to engage one or the other set of pawls, substantially as described.

4. In driving mechanism for a self-propelled vehicle, the combination with the road wheels, of a shaft or axle on which the road wheels of the vehicle are mounted to rotate, a ratchet carrier or support at each end of the axle, means for driving said ratchet carriers, a pair of ratchets on each carrier, said ratchets having reversely pitched ratchet teeth, a pawl carrier secured to each road wheel, a pair of pawls mounted on each pawl carrier, the pawls of each pair being reversed to coöperate with their respective ratchets, and means for shifting the ratchet carriers longitudinally of the axle, said ratchets and pawls being located betwen said road wheels; substantially as described.

5. In driving mechanism for a self-propelled vehicle, the combination with the driving road wheels of such vehicle, of an axle on which said wheels are mounted to rotate, a casing secured to each wheel, a driving sprocket wheel arranged toward each end of the axle and having an extended hub encircling the axle, ratchet carriers or supports encircling said hubs, a shaft arranged within the axle, means for securing the shaft and ratchet carriers together, said shaft being arranged for longitudinal movement, reversely arranged ratchet wheels secured to said ratchet carriers and encircling the axle, and correspondingly reversely arranged pawls on said casings to coöperate with the ratchet wheels.

6. In driving mechanism for a self-propelled vehicle, the combination of an axle on which the driving road wheels of the vehicle are mounted to rotate, a rotatable ratchet carrier or support at each end of the axle, a pair of ratchets on each carrier, said ratchets having reversely pitched ratchet teeth, a pawl carrier secured to each road wheel, and the pivoted pawls mounted on said carriers and having extensions 19 to contact the pawl carrier to keep them in position to engage their ratchets; substantially as described.

7. In a driving mechanism for a self-propelled vehicle, the combination, with the road wheels of such a vehicle, of an axle on which the wheels are mounted to rotate, a ratchet carrier located at each end of the axle and having a central hub portion encircling such axle, each carrier being arranged for rotary movement and for longitudinal movement independent of the axle, ratchets secured to each carrier and arranged in parallel planes but in juxtaposition, means for driving the ratchet carriers, a pawl carrier secured to each road wheel, separate pawls arranged on said pawl carrier and adapted to coöperate with the ratchets, and means for shifting the ratchet carriers longitudinally of the axle for disconnecting one set of ratchets and pawls and connecting another set thereof at each end of the axle; substantially as described.

8. In a driving mechanism for a self-propelled vehicle, the combination, with the road wheels of such a vehicle, of an axle on which the wheels are mounted to rotate, a ratchet carrier located at each end of the axle and having a central hub portion encircling such axle, each carrier being arranged for rotary movement and for longitudinal movement independent of the axle, ratchets secured to each carrier and arranged in parallel planes but in juxtaposition, means for driving the ratchet carriers, a pawl carrier secured to each road wheel, separate pawls arranged on said pawl carrier and adapted to coöperate with the ratchets, and means for shifting the ratchet carriers longitudinally of the axle for disconnecting one set of ratchets and pawls and connecting another set thereof at each end of the axle, said pawl carriers being formed as casings for inclosing the pawls and ratchets; substantially as described.

9. In a driving mechanism for a self-propelled vehicle, the combination, with the road wheels of such a vehicle, of an axle on which such wheels are mounted to rotate, a ratchet carrier located at each end of the axle and having a central hub portion encircling such axle, each carrier being arranged for rotary movement and for longitudinal movement independent of the axle, ratchets secured to each carrier and arranged in parallel planes but in juxtaposition, driving wheels 3 having hubs operatively connected with the ratchet carriers, a pawl carrier secured to each road wheel, separate pawls arranged on said pawl carrier and adapted to coöperate with the ratchets, and means for shifting the ratchet carriers longitudinally of the axle for disconnecting one set of ratchets and pawls and connecting another set thereof at each end of the axle; substantially as described.

10. In a driving mechanism for a self-propelled vehicle, the combination, with the road wheels of such a vehicle, of a tubular axle on which the wheels are mounted, a second axle located within the tubular axle; ratchet carriers operatively connected with the second axle means for driving said ratchet carriers; reversely arranged ratchets mounted on said ratchet carriers, correspondingly reversed pawls operatively connected with said wheels, and means for shifting said second axle and thereby causing one or the other set of ratchets to engage its set of pawls; substantially as described.

11. In a driving mechanism for a self-propelled vehicle, the combination, with the road wheels of such a vehicle, of a tubular axle on which the wheels are mounted, a second axle located within the tubular axle; driving wheels having hubs fitted and adapted to rotate upon said tubular axle, ratchet carriers operatively connected with said hubs, reversely arranged ratchets on said ratchet carriers, correspondingly reversed sets of pawls operatively connected with said road wheels, and means for shifting the second axle and thereby causing said ratchets to engage one or the other set of pawls; substantially as described.

CHARLES B. HATFIELD, Jr.

Witnesses:
R. F. HOLLISTER,
H. I. WEED.